US008950340B2

United States Patent
Wang et al.

(10) Patent No.: US 8,950,340 B2
(45) Date of Patent: Feb. 10, 2015

(54) BALLAST HOPPER CAR DISCHARGE DOOR CONTROL SYSTEM

(75) Inventors: Shengkun Wang, Qiqihar (CN); Yong Fu, Qiqihar (CN); Linghan Yue, Qiqihar (CN); Yongfeng Yi, Qiqihar (CN); Junlin Zhang, Qiqihar (CN)

(73) Assignee: Qiqihar Railway Rolling Stock Co., Ltd., Heilongjiang (CN)

( * ) Notice: Subject to any disclaimer, the term of this patent is extended or adjusted under 35 U.S.C. 154(b) by 253 days.

(21) Appl. No.: 13/566,912

(22) Filed: Aug. 3, 2012

(65) Prior Publication Data

US 2013/0000509 A1    Jan. 3, 2013

Related U.S. Application Data

(63) Continuation of application No. PCT/CN2011/074770, filed on May 27, 2011.

(30) Foreign Application Priority Data

Jan. 6, 2011    (CN) .......................... 2011 1 0002165

(51) Int. Cl.
     *B61D 3/00*          (2006.01)
     *B61D 5/00*          (2006.01)
     (Continued)

(52) U.S. Cl.
     CPC .. *B61D 7/18* (2013.01); *B61D 7/28* (2013.01); *Y02T 30/40* (2013.01)
     USPC .......................... 105/239; 105/240; 105/241.2

(58) Field of Classification Search
     USPC ........ 105/238.1, 239, 240, 241.1, 241.2, 247, 105/248
     See application file for complete search history.

(56) References Cited

U.S. PATENT DOCUMENTS

| 3,828,948 A | 8/1974 | Peterson ......................... 214/63 |
| 4,542,701 A | 9/1985 | Fischer et al. ................. 105/240 |

(Continued)

FOREIGN PATENT DOCUMENTS

| CN | 101148171 A | 3/2008 |
| CN | 101314356 A | 12/2008 |

(Continued)

OTHER PUBLICATIONS

International Search Report of International Application No. PCT/CN2011/074770, dated Oct. 13, 2011.

*Primary Examiner* — R. J. McCarry, Jr.
(74) *Attorney, Agent, or Firm* — J.C. Patents (57) ABSTRACT

The present invention discloses a ballast hopper car discharge door control system, comprising a control box, said control box comprises electrical pneumatic control system and receiving device; hydraulic system, connected to electrical pneumatic control system; manual control device and remote control device are operated to control opening or closing of ballast hopper car discharge doors; storage battery, configured to provide electrical pneumatic control system in said control box with continuous power supply and remote control device with charging power supply; pressure switch, arranged between control box and storage battery, said pressure switch is operated by pressure of air source to control connecting and disconnecting between storage battery and control box. The ballast hopper car discharge door control system provided by the present invention prevents false on-site operation of discharge door, thus prevents unexpected operation, improves discharging efficiency of ballast hopper car and reduces workload of operator.

11 Claims, 5 Drawing Sheets

(51) Int. Cl.
   *B61D 7/18* (2006.01)
   *B61D 7/28* (2006.01)

(56) References Cited

U.S. PATENT DOCUMENTS 5,359,942 A * 11/1994 Ward .............................. 105/240
RE36,685 E * 5/2000 Bounds ....................... 105/311.1
2002/0078854 A1 6/2002 Gaydos ......................... 105/247

FOREIGN PATENT DOCUMENTS

| CN | 201347524 Y | 11/2009 |
| CN | 101725105 A | 6/2010 |
| CN | 201923140 U | 8/2011 |

* cited by examiner

BALLAST HOPPER CAR DISCHARGE DOOR CONTROL SYSTEM

CROSS-REFERENCE TO RELATED APPLICATIONS

This application is a continuation of International Application No. PCT/CN2011/074770, filed on May 27, 2011, which claims the priority benefit of China Patent Application No. 201110002165.9, filed on Jan. 6, 2011. The contents of the above identified applications are incorporated herein by reference in their entirety.

FIELD OF THE TECHNOLOGY

The present invention relates to the vehicle control system technology, and particularly to a ballast hopper car discharge door control system.

BACKGROUND

Railroad freight transportation is an important support of national economy in each country, and how to improve the economic benefits of railroad transportation is the top priority in railroad industry.

The important measures to improve the economic benefits of railroad transportation is to improve efficiencies of transportation, while building high-grade lines is the premise of improving efficiencies of railroad transportation. Thus, there is a need to improve the transportation efficiencies of the vehicle for building railroad and meanwhile ensure safety of railroad building operation. Since ballast hopper car is currently the special vehicle for transporting materials such as ballast while building the railroad, improvement of transportation efficiencies of the ballast hopper car and operation safety are highly demanded.

Ballast hopper car discharge door control system, configured to control opening or closing of ballast hopper car discharge door, is an important part to ensure operation safety of ballast hopper car. In the prior art, air source pressure provides power to control system, and remote control device and manual control device transmit control signal to control box in the control system, so as to control opening or closing of discharge door. In the practical application, however, such control manner cannot ensure to quickly change the working states of the whole control system in case of man-made false operation, cannot prevent false control on opening or closing of discharge door caused by false operation, and cannot ensure the isolation of power supply from the control box when the control box goes wrong or needs maintenance, thus cannot ensure safety of the operation.

The conventional ballast hopper car usually comprises eight discharge doors, four of which are provided on the front end of the middle part of the vehicle body, the rest of which are provided on the rear end of the middle part of the vehicle body. The conventional remote control device usually comprises eight control buttons, each control button controls the opening or closing of one discharge door, and these discharge doors cannot be controlled in groups but only can be controlled one by one, therefore, the efficiency is relatively low. In addition, the ballast hopper car cannot discharge ballast in the middle of the railroad, but only at two sides of the railroad, and in the process of railroad building, ballast at two sides of the railroad is transported to the middle of the railroad by means of manual operation, therefore, the efficiency is low.

The conventional ballast hopper car discharge door control system is not provided with a car charger for a storage battery of the remote control device, and the ballast hopper car spends most of the time on field operation, thus it is inconvenient when the remote control device runs out of the storage battery and is unable to be recharged in no time.

SUMMARY

According to one aspect of the present invention, there is provided a ballast hopper car discharge door control system, aiming to improve efficiency of the ballast hopper car and reduce workload of operator.

According to another aspect of the present invention, there is provided a ballast hopper car discharge door control system, comprising:

a control box, comprising an electrical pneumatic control system and a receiving device of the ballast hopper car discharge door control system, said electrical pneumatic control system is an electrical control device and a pneumatic control device of the ballast hopper car discharge door control system and comprises an electrical element, a pneumatic element, a control circuit and a control air passage; and said receiving device is capable of receiving various control signals so as to control working states of said electrical pneumatic control system;

a hydraulic system, connected to said control box, said hydraulic system is an air-liquid conversion device;

a manual control device, connected to the electrical pneumatic control system in said control box, said manual control device is operated to control opening or closing of ballast hopper car discharge doors;

a remote control device, configured to transmit control signal to the receiving device, comprising a housing, a control button, an integrated control circuit and a storage battery, said control button is operated to control opening or closing of the ballast hopper car discharge doors;

a storage battery, configured to provide the electrical pneumatic control system in said control box with continuous power supply and the remote control device with charging power supply; and a pressure switch, arranged between the control box and the storage battery, connected to an outlet of an air source, said pressure switch is operated by pressure of the air source to control connecting and disconnecting between the storage battery and the control box.

Through the embodiments of the present invention, the ballast hopper car discharge door control system can prevent false on-site operation of discharge doors, thus prevent unexpected operation, ensure safety of the operation, and improve transporting efficiency of ballast hopper car.

REFERENCE NUMERALS

| | | |
|---|---|---|
| 11-Air Reservior; | 12-Pressure Switch; | 13-Pneumatic Control Reversing Valve; |
| 14-Manual Remote Control Interlocking Device; | 15-Storage battery; | 16-Isolation Locking Device; |
| 17-Air Control System Blast Main; | 18-Hydraulic System; | 19-Solar Panel; |
| 20-Discharge Door; | 21-Receving Device; | 22-Solar Conversion Device; |
| 23-First Interface; | 24-Second Interface; | 25-Electrical pneumatic Control System; |
| 26-Manual Control Device. | | |

DETAILED DESCRIPTION

In order to make the objects, technical solutions and advantages of embodiments of the present invention clearer, a clear and complete description of technical solutions of the embodiments of the present invention is given by reference to accompanying drawings corresponding to the embodiments of the present invention. Apparently, the accompanying drawings outlined below are not exhaustive, and all the other embodiments derived by persons of ordinary skill in the art from the embodiments of the present invention without making any creative effort fall within the scope of the present invention.

Embodiment 1

One embodiment of the present invention provides a ballast hopper car discharge door control system, and said control system comprises a control box, a hydraulic system, a manual control device, a remote control device, a storage battery and a pressure switch.

The control box comprises an electrical pneumatic control system and a receiving device of the ballast hopper car discharge door control system, wherein said electrical pneumatic control system is an electrical control device and a pneumatic control device of the ballast hopper car discharge door control system, and comprises various electrical elements, pneumatic elements, various control circuits and control air passages; and said receiving device is capable of receiving various control signals so as to control working states of said electrical control device. Said control box has the same functions and structures with the control box of the conventional ballast car.

The receiving device in the control box is usually a PLC controller, capable of receiving signals transmitted from the remote control device, said receiving device can achieve remote control function through receiving control signals of the remote control device, and also can change the working states of various elements of the electrical control device and the air control device of the electrical pneumatic control system in the control box through receiving control signals of the pressure switch.

The hydraulic system is connected to the electrical pneumatic control system in the control box, and said hydraulic system is an air-liquid conversion device, configured to convert air pressure to hydraulic pressure of a hydraulic cylinder to drive actions of ballast hopper car discharge door, thereby drive opening or closing of ballast hopper car discharge door. Said hydraulic system is the conventional hydraulic system in the prior art.

The manual control device is connected to the electrical pneumatic control system in the control box. Usually, buttons of said manual control device are arranged at two sides of ballast hopper car, of course, also can be in other positions, not limited to this embodiment. The manual control device is operated to control the opening or closing of ballast hopper car discharge door, and discharge ballast for building the railroad at one side of discharge door to the specified position when the discharge door opens. Said manual control device has the same functions and structures with the manual control device in the prior art.

The remote control device is configured to transmit control signals to the receiving device and comprises a housing, a control button, an integrated control circuit and a storage battery, said control button is operated to control opening or closing of the ballast hopper car discharge door; in particular, said remote control device is similar to remote controllers in TV or air conditioner in the appearance. Said integrated control circuit of said remote control device is encapsulated in said housing, and said control button is arranged outside the housing, or in other manners, not limited to this embodiment.

The storage battery is configured to provide the electrical pneumatic control system in said control box with continuous power supply and the remote control device with charging power supply; said storage battery is the same with the storage battery of the vehicle device in the prior art.

The pressure switch is arranged between the control box and the storage battery and connected to outlet of an air source in an air reservoir, and said pressure switch is operated by pressure of the air source to control connecting and disconnecting between the storage battery and the control box.

The pressure switch is in the disconnecting state when the ballast hopper car doesn't work, meanwhile, the storage battery is disconnected with circuit of the control box, said control box doesn't work; the pressure switch is actuated only after the pressure of the air source in the air reservoir meets the requirements, thus to switch on the switch between the storage battery and the circuit of the control box, and then, said storage battery provides said control box with power to start said control box, at this time, the receiving device receives control signals transmitted by the remote control device to drive actions of various elements in the electrical pneumatic control system, thereby to control opening or closing of the discharge door.

The pressure switch is the pressure switch in the prior art, which can be a mechanical or electrical pressure switch.

End walls, side walls, discharge doors and an underframe are assembled by welding as a whole, a coupler draft gear, an air brake, a marker, the hydraulic system, the air control system and underframe accessories are mounted on said underframe to form a vehicle body, a bottom door opening or closing mechanism is arranged at the bottom of said underframe, and the assembled vehicle body is placed on two bogies to form a complete ballast hopper car. The connecting manners of the above parts are the same with the ballast hopper car in the prior art.

Seen from the above technical solutions, in said ballast hopper car discharge door control system, the air pressure provides power source, air control system blast main of a locomotive inflates air to air reservoir of each ballast hopper car, pressured air in the air reservoir provides air pressure for pneumatic motor of discharge door hydraulic system, thereby said pneumatic motor converts the air pressure to the hydraulic pressure for driving actions of the ballast hopper car discharge door, remote or manual device changes working states of various elements of the electrical pneumatic control system in the control box, and eventually controls opening or closing of ballast hopper car discharge door.

Different from the conventional discharge door control system, in the ballast hopper car discharge door control system according to the embodiment, the pressure switch is arranged at the outlet of the air source in the air reservoir, and said pressure switch is operated by pressure of the air source in the air reservoir and actuated only after the pressure of the air source in the air reservoir meets the requirements. The storage battery provides said control box with power to start said control box, and air supply pipeline provides power to the hydraulic system to drive actions of the discharge door, thus preventing discharging of the ballast hopper car caused by false opening of discharge door by on-site operator, in case of the discharge door control system failing to achieve working states, and ensuring safety of the operation.

In said ballast hopper car discharge control system, the control signal is transmitted by the remote control device to drive opening or closing of the discharge door, and when said remote control device has faults or is in emergency, the manual control device also can be operated to control opening or closing of the discharge door.

Embodiment 2

Figure 1:
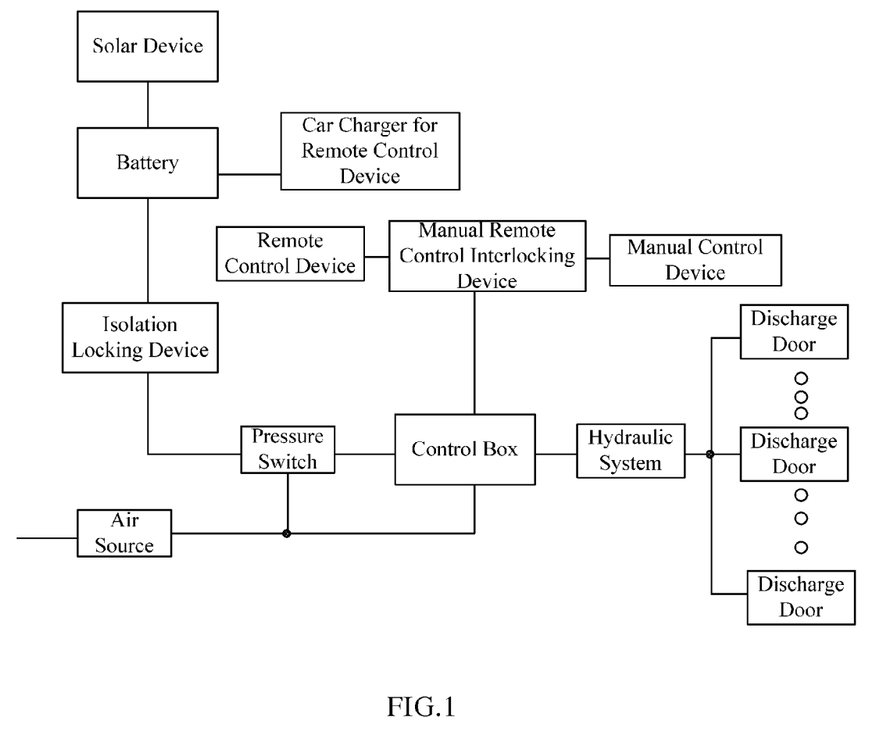
FIG. 1 is a schematic view of relationship among each parts of a ballast hopper car discharge door control system according to Embodiment 2 of the present invention.

FIG. 1 is a schematic view of relationship among each parts of a ballast hopper car discharge door control system according to Embodiment 2 of the present invention, as shown in FIG. 1, said ballast hopper car discharge door control system is further provided with an isolation locking device, a manual remote control interlocking device, a solar device and a car charger for remote control device, on the basis of technical solutions of the above Embodiment 1.

Said isolation locking device is arranged between the pressure switch and the storage battery, with one end connected to the storage battery, and the other end connected to the pressure switch, so as to electrically isolate the storage battery and the control box.

In this embodiment, said isolation locking device is configured to electrically isolate the storage battery and the control box, in case of maintenance to the control box, said isolation locking device can be started to electrically isolate the storage battery and the control box, thus isolate the control box and power supply, ensuring life safety of operator and avoiding property loss, and said isolation locking device has the same structures and functions with the isolation locking device in the prior art, usually is an isolation switch, or in other manners, not limited to this embodiment.

Furthermore, the manual remote control interlocking device is further provided for switching between the manual control device and the remote control device, normally, the remote control device is used to control operation. However, in order to avoid false operation of on-site operator to manual control device when using the remote control device and further accidents caused by false actions of discharge door, the manual remote control interlocking device is therefore added in the control system. When the manual remote control interlocking device is started, the manual control device is prohibited to operate discharging when the remote control device is used, thus ensuring safety of the operation.

Operation using the remote control device can reduce the number of operators, meanwhile, the operator is capable of comprehensively observing all the situations in the discharging process while discharging, which not only ensures the safety of the operator, but also facilitates the operator to deal with the emergencies in time.

Of course, the manual remote control interlocking device is started also when the manual remote control device is used, to prevent false actions of the remote control device. Said manual remote control interlocking device has the same structures with the manual remote control interlocking device in the prior art.

Furthermore, the car charger for remote control device is further provided, with one end connected to the storage battery and the other end connected to the remote control device, and the storage battery charges the remote control device through the car charger for remote control device.

Said car charger for remote control device is to charge the remote control device and provide convenience for the on-site operation, timely charging to the storage battery of the remote control device prevents operation termination and accidents caused by the remote control device running out of the storage battery, and said car charger for remote control device is the conventional car charger for remote control device in the prior art.

Furthermore, the solar device is further provided in the ballast hopper car discharge door control system, and said solar device is connected to the storage battery and converts solar energy to electrical energy so as to charge the storage battery utilizing solar energy.

The solar device mainly comprises solar panels and solar conversion devices, said solar panels can be mounted on the top of the ballast hopper car, thereby utilizing solar energy at any times, said solar device converts solar energy to electrical energy, and then storages the electrical energy to the storage battery. Such function is very essential for field operation, to prevent the whole discharge door control system from not working due to running out of the storage battery. Usually, said solar device mainly comprises solar panels and solar conversion devices, and has the same structures and functions with the solar device in the prior art.

Furthermore, the remote control device further comprises a discharge door linkage button on the basis of the above embodiments, meanwhile, code for achieving the linkage function of the discharge door is added in the receiving device of the conventional remote device, configured to control opening or closing of the plurality of discharge doors of ballast hopper car at the same time. Said code for linkage function is provided by the manufacturer on the original receiving device according to the requirements of the customers, and then corresponding button is provided in the remote control device so as to achieve linkage control operation to the discharge doors.

One or more discharge door linkage buttons can be added, each button controls the opening or closing of the plurality of discharge doors at the same time, said discharge door linkage button is configured according to the requirements of operation, for example, two discharge door linkage buttons are added, one can control the opening or closing of the four discharge doors at the same time, while the other can control the opening or closing of the other four discharge doors at the same time, not limited to this embodiment.

Therefore, adding discharge door linkage buttons in the remote control device can greatly improve discharge efficiency and reduce the workload of the on-site operators.

Moreover, discharge door linkage buttons can control opening or closing of the plurality of discharge doors at the same time, capable of discharging ballast at two sides of the railroad or in the middle of the railroad as required, or both at two sides of the railroad and in the middle of the railroad, therefore, labor cost is reduced and track-laying efficiency is improved.

Hereinafter, the working principle of ballast hopper car discharge door control system according to Embodiment 2 of the present invention will be described in detail by reference to the accompanying drawings. As shown in FIGS. 2-6, said discharge door control system is integrated with electrical, hydraulic, pneumatic control, remote and mechanical transmission, a first interface 23 is connected to a receiving device 21, and a second interface 24 is connected to a car charger for remote control device (not shown). An air control system blast main 17 of a locomotive inflates air to air reservoir 11 of each ballast hopper car, pressured air in the air reservoir 11 provides air pressure for a pneumatic motor of a discharge door hydraulic system 18, and thereby said pneumatic motor converts the air pressure to hydraulic pressure for driving actions of ballast hopper car discharge doors. When air pressure in said air reservoir 11 reaches the predetermined rated pressure, a pressure switch 12 connects contact points 1 and 3 in the receiving device 21, at this time, a remote control device (not shown) is operated to control the interface circuits YV1-YV16 of the receiving device 21 to transmit signals for controlling actions of solenoid valves F1-F16 in an electrical pneumatic control system 25 of a control box, thereby, the solenoid valves F1-F16 can drive the actions of oil cylinder for controlling opening or closing of discharge doors together with said hydraulic system 18 so as to achieve control on opening or closing of discharge doors 20.

When said discharge door control system is maintained, firstly, the switch of an isolation locking device 16 is switched off, and the connection between a storage battery 15 and circuit of the control box is disconnected. When a manual control device 26 is used to control the discharge doors 20, firstly a manual remote control interlocking device 14 is started, thereby disconnecting a pneumatic control reversing valve 13 and cutting off air supply passages of solenoid valves F1-F16, at this time, even if the solenoid valves F1-F16 receive signals for actions transmitted by interface circuits YV1-YV16 of receiving device 21, since air supply passages have been cut off, the solenoid valves F1-F16 cannot drive the actions of the oil cylinder for controlling opening or closing of discharge door together with said hydraulic system 18, and thus the remote control device is unable to control opening or closing of discharge doors 20.

Figure 4:
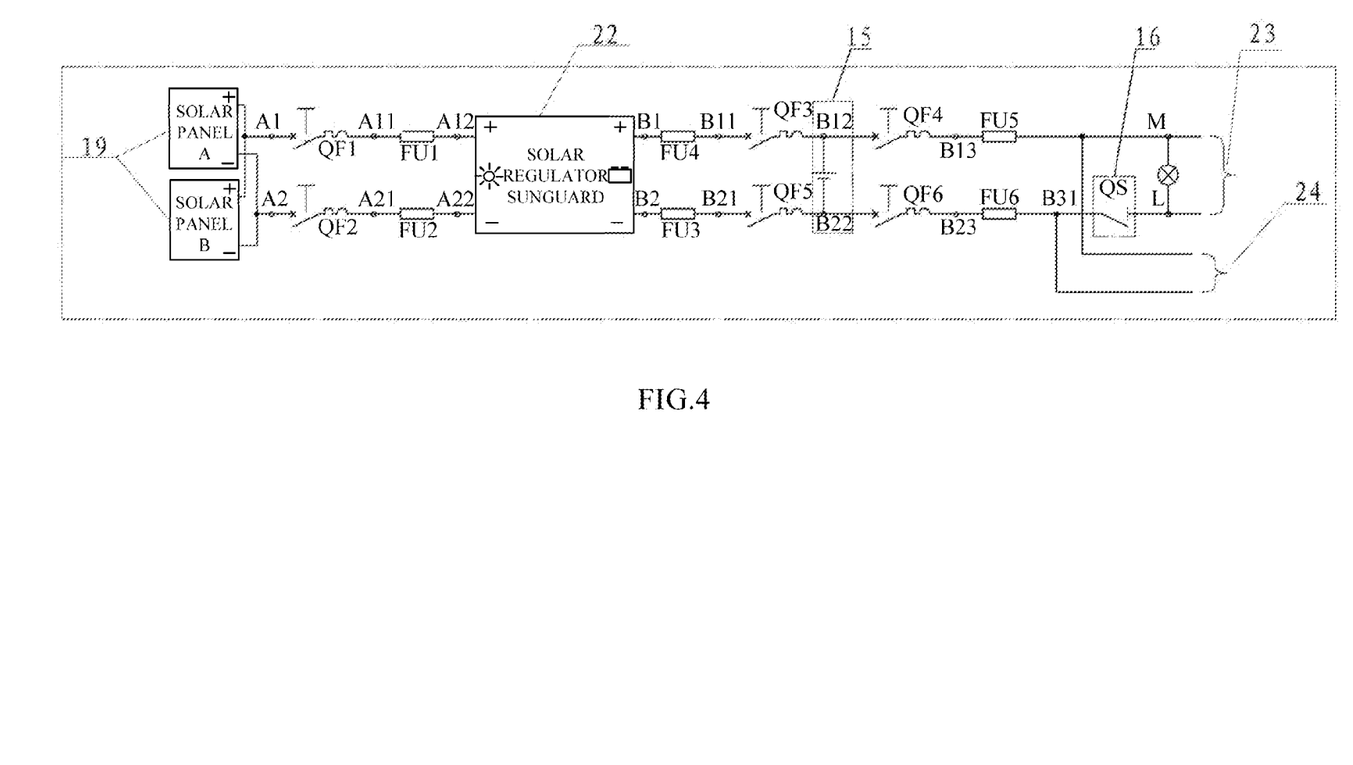
FIG. 4 is a schematic view of a solar device of the ballast hopper car discharge door control system according to Embodiment 2 of the present invention.
Figure 5:
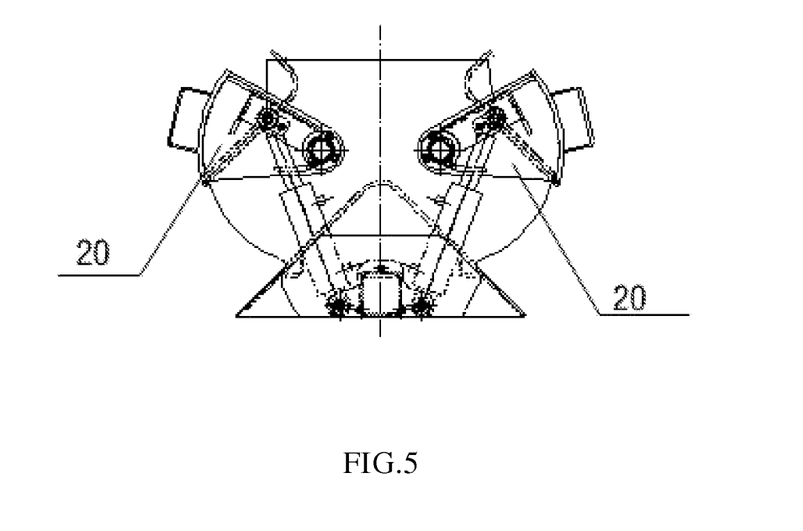
FIG. 5 is a schematic structural view of an opening state of the ballast hopper car discharge door.
Figure 6:
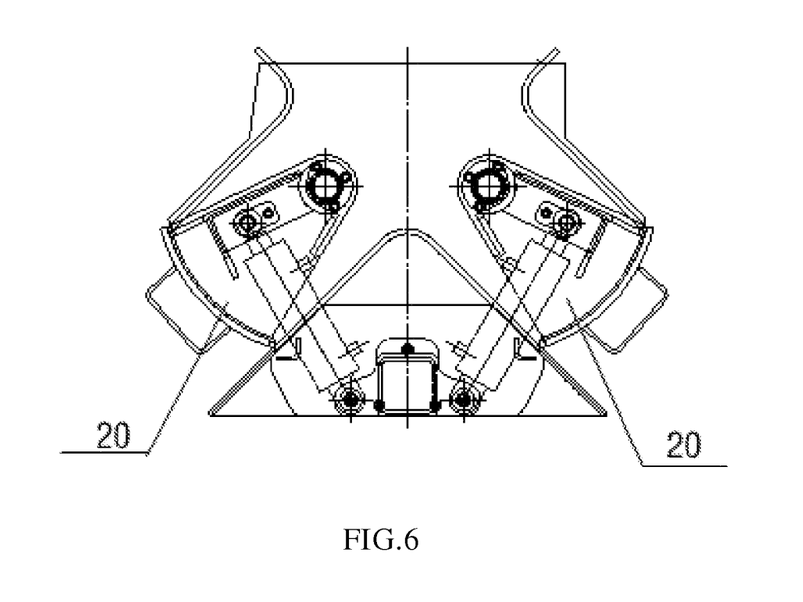
FIG. 6 is a schematic structural view of a closing state of the ballast hopper car discharge door.

The solar device mainly comprises solar panels 19 and solar conversion devices 22, and said solar device converts solar energy to electrical energy so as to charge the storage battery 15.

Figure 2:
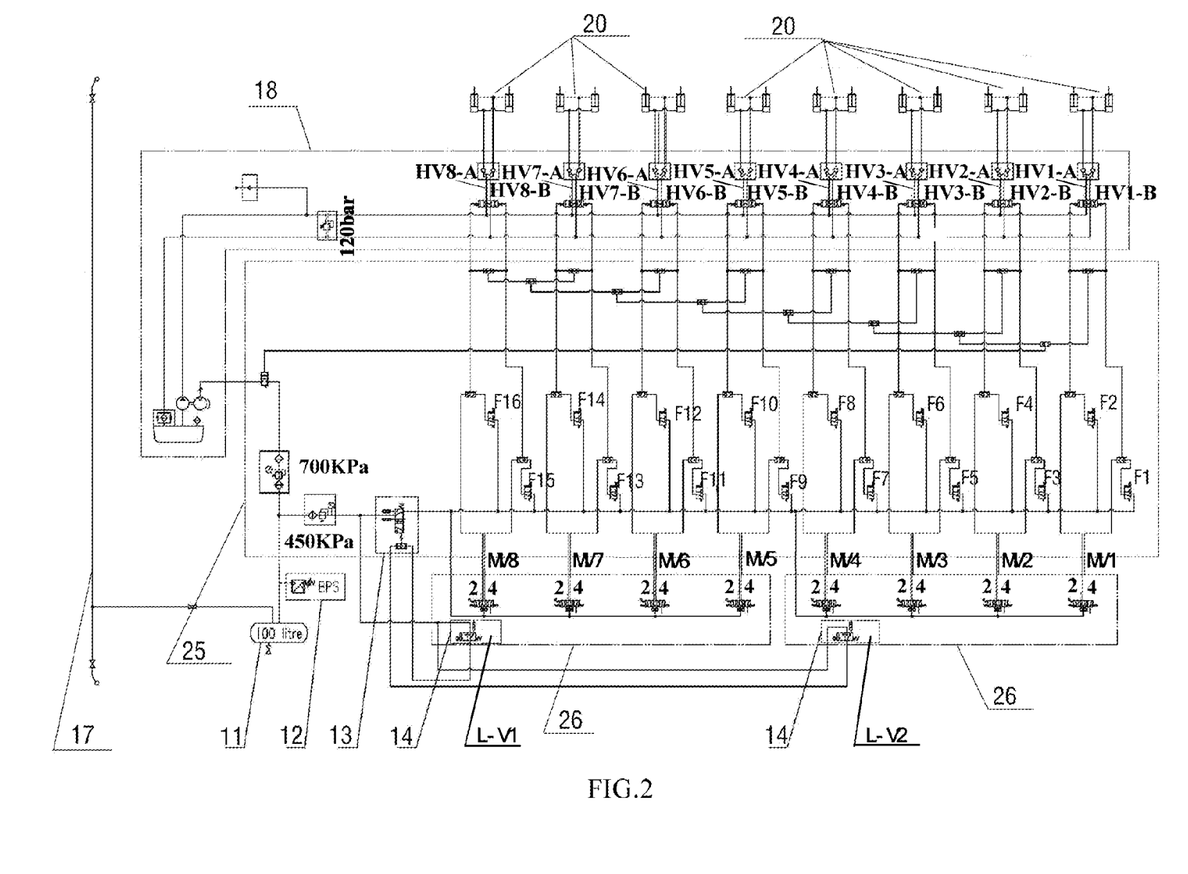
FIG. 2 is a schematic view of a control box of the ballast hopper car discharge door control system according to Embodiment 2 of the present invention.
Figure 3:
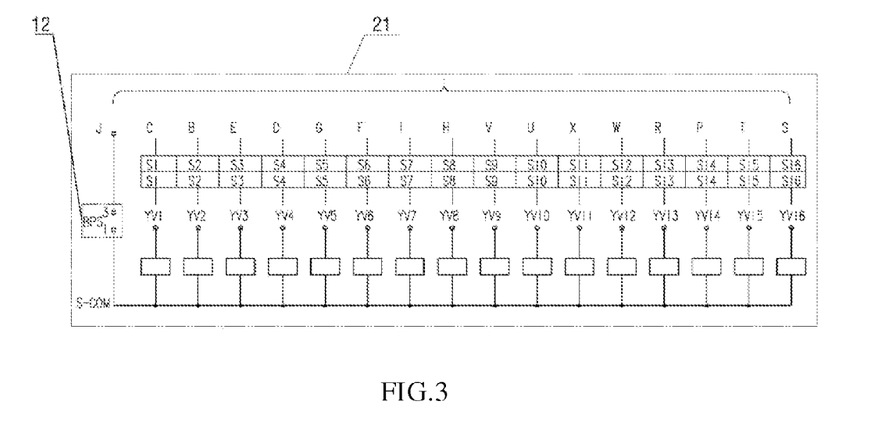
FIG. 3 is a schematic view of a receiving device of the ballast hopper car discharge door control system according to Embodiment 2 of the present invention.

Car charger for remote control device (not shown) is connected to the storage battery 15 via the second interface 24, such that the storage battery 15 charges the remote control device via said car charger for remote control device.

Embodiment 2 is the preferred embodiment of the present invention, the ballast hopper car of the present invention can only add an isolation locking device in the discharge door control system on the basis of Embodiment 1, or only add one or more of a manual remote control interlocking device, a solar device and a car charger for remote control device on the basis of Embodiment 1. All of the above are embodiments of the present invention and all fall within the scope protected by the present invention.

The ballast hopper car discharge door control system provided by the present invention can be applied on the ballast hopper car in the prior art as the car discharge door control system of the ballast hopper, configured to control operating states of the ballast hopper car discharge door, and capable of improving transporting efficiency of ballast hopper car.

Finally, it should be noted that the above embodiments are merely provided for describing the technical solutions of the present invention, but not intended to limit the present invention. It should be understood by those of ordinary skill in the art that although the present invention has been described in detail with reference to the foregoing embodiments, modifications can be made to the technical solutions described in the foregoing embodiments, or equivalent replacements can be made to some technical features in the technical solutions, as long as such modifications or replacements do not cause the essence of corresponding technical solutions to depart from the spirit and scope of the embodiments of the present invention.

What is claimed is:

1. A ballast hopper car discharge door control system, comprising:
    a control box, comprising an electrical pneumatic control system and a receiving device of the ballast hopper car discharge door control system, said electrical pneumatic control system is an electrical control device and a pneumatic control device of the ballast hopper car discharge door control system and comprises an electrical element, a pneumatic element, a control circuit and a control air passage; and said receiving device is capable of receiving various control signals so as to control working states of said electrical pneumatic control system;
    a hydraulic system, connected to said control box, said hydraulic system is an air-liquid conversion device;
    a manual control device, connected to the electrical pneumatic control system in said control box, said manual control device is operated to control opening or closing of ballast hopper car discharge doors;
    a remote control device, configured to transmit control signal to the receiving device, comprising a housing, a control button, an integrated control circuit and a storage battery, said control button is operated to control opening or closing of the ballast hopper car discharge doors;
    a storage battery, configured to provide the electrical pneumatic control system in said control box with continuous power supply and the remote control device with charging power supply;
    characterized in that, the ballast hopper car discharge door control system further comprises:
    a pressure switch, arranged between the control box and the storage battery, connected to an outlet of an air source, said pressure switch is operated by pressure of the air source to control connecting and disconnecting between the storage battery and the control box, and
    a car charger for remote control device, with one end connected to the storage battery and the other end connected to the remote control device, and said storage battery charges the remote control device through the car charger for remote control device.

2. The ballast hopper car discharge door control system according to claim 1, further comprising:
    an isolation locking device, arranged between the pressure switch and the storage battery, with one end connected to the storage battery, and the other end connected to the pressure switch, so as to electrically isolate the storage battery and the control box.

3. The ballast hopper car discharge door control system according to claim 2, further comprising: a manual remote control interlocking device, connected to the electrical pneumatic control system in said control box and configured to switch between the manual control device and the remote control device.

4. The ballast hopper car discharge door control system according to claim 2, further comprising:

a solar device, connected to said storage battery and converting solar energy to electrical energy so as to charge said storage battery utilizing the solar energy.

5. The ballast hopper car discharge door control system according to claim 2, characterized in that, said remote control device is provided with a discharge door linkage button, meanwhile, code for achieving linkage function of the discharge doors is added in the receiving device, configured to control opening or closing of the plurality of discharge doors of ballast hopper car at the same time.

6. The ballast hopper car discharge door control system according to claim 1, further comprising: a manual remote control interlocking device, connected to the electrical pneumatic control system in said control box and configured to switch between the manual control device and the remote control device.

7. The ballast hopper car discharge door control system according to claim 6, further comprising:

a solar device, connected to said storage battery and converting solar energy to electrical energy so as to charge said storage battery utilizing the solar energy.

8. The ballast hopper car discharge door control system according to claim 7, characterized in that, said remote control device is provided with a discharge door linkage button, meanwhile, code for achieving linkage function of the discharge doors is added in the receiving device, configured to control opening or closing of the plurality of discharge doors of ballast hopper car at the same time.

9. The ballast hopper car discharge door control system according to claim 1, further comprising:

a car charger for remote control device, with one end connected to the storage battery and the other end connected to the remote control device, and said storage battery charges the remote control device through the car charger for remote control device.

10. The ballast hopper car discharge door control system according to claim 1, further comprising:

a solar device, connected to said storage battery and converting solar energy to electrical energy so as to charge said storage battery utilizing the solar energy.

11. The ballast hopper car discharge door control system according to claim 1, characterized in that, said remote control device is provided with a discharge door linkage button, meanwhile, code for achieving linkage function of the discharge doors is added in the receiving device, configured to control opening or closing of the plurality of discharge doors of ballast hopper car at the same time.

\* \* \* \* \*